(12) United States Patent
Khajeh et al.

(10) Patent No.: US 10,802,651 B2
(45) Date of Patent: Oct. 13, 2020

(54) ULTRASONIC TOUCH DETECTION THROUGH DISPLAY

(71) Applicant: Apple Inc., Cupertino, CA (US)

(72) Inventors: Ehsan Khajeh, San Jose, CA (US); Aaron Scott Tucker, Cupertino, CA (US); Brian Michael King, Saratoga, CA (US); George Ho Yin Mak, Santa Clara, CA (US); Marcus Yip, San Carlos, CA (US); Mohammad Yeke Yazdandoost, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/256,942

(22) Filed: Jan. 24, 2019

(65) Prior Publication Data
US 2019/0235656 A1     Aug. 1, 2019

Related U.S. Application Data

(60) Provisional application No. 62/624,046, filed on Jan. 30, 2018.

(51) Int. Cl.
*G06F 3/043*     (2006.01)
*G06F 3/041*     (2006.01)

(52) U.S. Cl.
CPC .......... *G06F 3/043* (2013.01); *G06F 3/0412* (2013.01); *G06F 3/0416* (2013.01); *G06F 2203/04106* (2013.01)

(58) Field of Classification Search
CPC ...... G06F 3/043; G06F 3/0412; G06F 3/0416; G06F 2203/04106
See application file for complete search history.

(56) References Cited

U.S. PATENT DOCUMENTS

| | | | |
|---|---|---|---|
| 3,673,327 | A | 6/1972 | Johnson |
| 4,506,354 | A | 3/1985 | Hansen |
| 4,729,128 | A | 3/1988 | Grimes et al. |
| 4,746,914 | A | 5/1988 | Adler |
| 4,825,212 | A | 4/1989 | Adler |

(Continued)

FOREIGN PATENT DOCUMENTS

| | | |
|---|---|---|
| JP | 2000-163031 A | 6/2000 |
| JP | 2002-342033 A | 11/2002 |

(Continued)

OTHER PUBLICATIONS

Final Office Action dated Feb. 20, 2013, for U.S. Appl. No. 12/184,232, filed Jul. 31, 2008, 24 pages.

(Continued)

*Primary Examiner* — Premal R Patel
(74) *Attorney, Agent, or Firm* — Kubota & Basol LLP

(57) ABSTRACT

This relates to system architectures, apparatus and methods for acoustic touch detection (touch sensing) and exemplary applications of the system architectures, apparatus and methods. In some examples, the acoustic touch sensing techniques described herein can be used on a glass surface of a display or touch screen. In some examples, an acoustic touch sensing system can be configured to be insensitive to contact on the device surface by water, and thus acoustic touch sensing can be used for touch sensing in devices that are likely to become wet or fully submerged in water.

25 Claims, 6 Drawing Sheets

(56) References Cited

U.S. PATENT DOCUMENTS

| | | |
|---|---|---|
| 5,162,618 A | 11/1992 | Knowles |
| 5,381,696 A | 1/1995 | Ichinose et al. |
| 5,483,261 A | 1/1996 | Yasutake |
| 5,488,204 A | 1/1996 | Mead et al. |
| 5,515,298 A | 5/1996 | Bicz |
| 5,589,636 A | 12/1996 | Bicz |
| 5,591,945 A | 1/1997 | Kent |
| 5,719,950 A | 2/1998 | Osten et al. |
| 5,766,493 A | 6/1998 | Shin |
| 5,816,225 A | 10/1998 | Koch et al. |
| 5,825,352 A | 10/1998 | Bisset et al. |
| 5,835,079 A | 11/1998 | Shieh |
| 5,854,450 A | 12/1998 | Kent |
| 5,880,411 A | 3/1999 | Gillespie et al. |
| 5,886,452 A | 3/1999 | Toda |
| 6,078,315 A | 6/2000 | Huang |
| 6,091,406 A | 7/2000 | Kambara |
| 6,159,149 A | 12/2000 | Erikson et al. |
| 6,164,135 A | 12/2000 | Bicz |
| 6,188,391 B1 | 2/2001 | Seely et al. |
| 6,225,985 B1 | 5/2001 | Armstrong |
| 6,229,529 B1 | 5/2001 | Yano |
| 6,310,610 B1 | 10/2001 | Beaton et al. |
| 6,323,846 B1 | 11/2001 | Westerman et al. |
| 6,327,011 B2 | 12/2001 | Kim |
| 6,690,387 B2 | 2/2004 | Zimmerman et al. |
| 6,720,712 B2 | 4/2004 | Scott et al. |
| 6,856,259 B1 | 2/2005 | Sharp |
| 7,015,894 B2 | 3/2006 | Morohoshi |
| 7,032,454 B2 | 4/2006 | Amano |
| 7,079,118 B2 | 7/2006 | Benard |
| 7,098,891 B1 | 8/2006 | Pryor |
| 7,184,064 B2 | 2/2007 | Zimmerman et al. |
| 7,400,750 B2 | 7/2008 | Nam |
| 7,458,268 B2 | 12/2008 | Schneider et al. |
| 7,489,308 B2 | 2/2009 | Blake |
| 7,497,120 B2 | 3/2009 | Schneider et al. |
| 7,499,039 B2 | 3/2009 | Roberts |
| 7,568,391 B2 | 8/2009 | Schneider et al. |
| 7,573,466 B1 | 8/2009 | Marzen |
| 7,656,932 B2 | 2/2010 | Durand et al. |
| 7,663,607 B2 | 2/2010 | Hotelling et al. |
| 7,667,374 B2 | 2/2010 | Aono et al. |
| 7,734,435 B2 | 6/2010 | Thomas et al. |
| 7,739,912 B2 | 6/2010 | Schneider et al. |
| 7,770,456 B2 | 8/2010 | Stevenson et al. |
| 7,907,129 B2 | 3/2011 | Idzik |
| 8,047,995 B2 | 11/2011 | Wakabayashi et al. |
| 8,054,203 B2 | 11/2011 | Breed et al. |
| 8,085,998 B2 | 12/2011 | Setlak et al. |
| 8,095,328 B2 | 1/2012 | Thomas et al. |
| 8,169,404 B1 | 5/2012 | Boillot |
| 8,179,678 B2 | 5/2012 | Yamashita et al. |
| 8,201,739 B2 | 6/2012 | Schneider et al. |
| 8,335,356 B2 | 12/2012 | Schmitt |
| 8,345,508 B2 | 1/2013 | Wodnicki et al. |
| 8,479,122 B2 | 7/2013 | Hotelling et al. |
| 8,508,103 B2 | 8/2013 | Schmitt et al. |
| 8,536,465 B2 | 9/2013 | Kobayashi et al. |
| 8,576,202 B2 | 11/2013 | Tanaka et al. |
| 8,601,876 B2 | 12/2013 | Schneider et al. |
| 8,617,078 B2 | 12/2013 | Machida et al. |
| 8,666,126 B2 | 3/2014 | Lee et al. |
| 8,692,812 B2 | 4/2014 | Hecht |
| 8,724,859 B2 | 5/2014 | Schneider et al. |
| 8,724,869 B2 | 5/2014 | Funabasama et al. |
| 8,743,091 B2 | 6/2014 | Bernstein |
| 8,781,180 B2 | 7/2014 | Schneider et al. |
| 8,791,792 B2 | 7/2014 | Benkley, III |
| 8,982,089 B2 | 3/2015 | Lim |
| 9,044,171 B2 | 6/2015 | Venkatraman et al. |
| 9,056,082 B2 | 6/2015 | Liautaud et al. |
| 9,100,034 B2 | 8/2015 | Oshima et al. |
| 9,132,693 B2 | 9/2015 | Klootwijk et al. |
| 9,170,668 B2 | 10/2015 | Schneider et al. |
| 9,201,546 B2 | 12/2015 | Son et al. |
| 9,276,625 B2 | 3/2016 | Jing et al. |
| 9,323,393 B2 | 4/2016 | Djordjev et al. |
| 9,465,972 B2 | 10/2016 | Chung et al. |
| 9,568,315 B2 | 2/2017 | Il et al. |
| 9,607,203 B1 | 3/2017 | Yazdandoost et al. |
| 9,613,246 B1 | 4/2017 | Gozzini et al. |
| 9,747,488 B2 | 8/2017 | Yazdandoost et al. |
| 9,747,988 B2 | 8/2017 | Maeda |
| 9,778,193 B2 | 10/2017 | Vacca |
| 9,824,254 B1 | 11/2017 | Yazdandoost et al. |
| 9,904,836 B2 | 2/2018 | Yeke Yazdandoost et al. |
| 9,952,095 B1 | 4/2018 | Hotelling et al. |
| 9,979,955 B1 | 5/2018 | Guo |
| 9,984,271 B1 | 5/2018 | King et al. |
| 10,133,904 B2 | 11/2018 | Yazdandoost et al. |
| 2003/0102777 A1 | 6/2003 | Kuniyasu et al. |
| 2003/0109993 A1 | 6/2003 | Peat et al. |
| 2004/0140735 A1 | 7/2004 | Scott et al. |
| 2004/0164970 A1 | 8/2004 | Benard |
| 2004/0264746 A1 | 12/2004 | Polcha et al. |
| 2005/0017959 A1 | 1/2005 | Kraus |
| 2005/0052432 A1 | 3/2005 | Kraus |
| 2005/0083313 A1 | 4/2005 | Hardie-bick |
| 2005/0105784 A1 | 5/2005 | Nam |
| 2005/0248548 A1 | 11/2005 | Tsumura |
| 2006/0026521 A1 | 2/2006 | Hotelling et al. |
| 2006/0097991 A1 | 5/2006 | Hotelling et al. |
| 2006/0196271 A1 | 9/2006 | Jancsik et al. |
| 2006/0197753 A1 | 9/2006 | Hotelling |
| 2007/0211031 A1 | 9/2007 | Marc |
| 2007/0240913 A1 | 10/2007 | Schermerhorn |
| 2008/0059761 A1 | 3/2008 | Norman |
| 2008/0114251 A1 | 5/2008 | Weymer |
| 2008/0142571 A1 | 6/2008 | Yokozuka et al. |
| 2008/0175450 A1 | 7/2008 | Scott |
| 2008/0266266 A1 | 10/2008 | Kent |
| 2009/0167704 A1 | 7/2009 | Terlizzi et al. |
| 2010/0026667 A1 | 2/2010 | Bernstein |
| 2010/0237992 A1 | 9/2010 | Liautaud |
| 2010/0239133 A1 | 9/2010 | Schmitt et al. |
| 2011/0227862 A1 | 9/2011 | Lim |
| 2012/0092026 A1 | 4/2012 | Liautaud et al. |
| 2012/0275669 A1 | 11/2012 | Kim |
| 2013/0015868 A1 | 1/2013 | Peng |
| 2013/0194241 A1* | 8/2013 | Jeng .................. G06F 3/043 345/177 |
| 2014/0198072 A1* | 7/2014 | Schuele .............. G06F 3/044 345/174 |
| 2014/0333328 A1 | 11/2014 | Nelson et al. |
| 2014/0352440 A1 | 12/2014 | Fennell et al. |
| 2014/0355381 A1 | 12/2014 | Lal et al. |
| 2014/0359757 A1 | 12/2014 | Sezan et al. |
| 2015/0053006 A1 | 2/2015 | Decoux et al. |
| 2015/0185898 A1 | 7/2015 | Masson et al. |
| 2015/0189136 A1 | 7/2015 | Chung et al. |
| 2015/0192547 A1 | 7/2015 | Lee et al. |
| 2015/0293639 A1* | 10/2015 | Furutani ........... G02F 1/134309 345/174 |
| 2015/0358740 A1 | 12/2015 | Tsai et al. |
| 2016/0063300 A1 | 3/2016 | Du et al. |
| 2016/0092714 A1 | 3/2016 | Yazdandoost et al. |
| 2016/0092715 A1 | 3/2016 | Yazdandoost et al. |
| 2016/0092716 A1 | 3/2016 | Yazdandoost et al. |
| 2016/0117541 A1 | 4/2016 | Lu et al. |
| 2016/0246396 A1 | 8/2016 | Dickinson et al. |
| 2016/0350573 A1 | 12/2016 | Kitchens et al. |
| 2017/0053151 A1 | 2/2017 | Yeke Yazandoost et al. |
| 2017/0255338 A1 | 9/2017 | Medina et al. |
| 2017/0357839 A1 | 12/2017 | Yazdandoost et al. |

(56) References Cited

U.S. PATENT DOCUMENTS

2018/0046836 A1\* 2/2018 Hinger .............. G01S 7/52079
2019/0004662 A1\* 1/2019 Gagne-Keats ........ G06F 3/0414

FOREIGN PATENT DOCUMENTS

WO 94/02911 A1 2/1994
WO 2005103872 A2 11/2005

OTHER PUBLICATIONS

Final Office Action dated Aug. 27, 2013, for U.S. Appl. No. 12/184,232, filed Jul. 31, 2008, 25 pages.
Non-Final Office Action dated Nov. 18, 2011, for U.S. Appl. No. 12/184,232, filed Jul. 31, 2008, 21 pages.
Non-Final Office Action dated Jul. 25, 2012, for U.S. Appl. No. 12/184,232, filed Jul. 31, 2008, 18 pages.
Notice of Allowance dated Mar. 14, 2014, for U.S. Appl. No. 12/184,232, filed Jul. 31, 2008, eight pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Advisory Action received for U.S. Appl. No. 14/822,614, dated Apr. 30, 2018, 3 pages.
Advisory Action received for U.S. Appl. No. 14/823,928, dated Aug. 17, 2017, 4 pages.
Corrected Notice of Allowance received for U.S. Appl. No. 14/590,821, dated Aug. 21, 2017, 2 pages.
Final Office Action received for U.S. Appl. No. 14/590,821, dated Apr. 5, 2017, 10 pages.
Final Office Action received for U.S. Appl. No. 14/822,614, dated Apr. 12, 2017, 20 pages.
Final Office Action received for U.S. Appl. No. 14/822,614, dated Feb. 23, 2018, 22 pages.
Final Office Action received for U.S. Appl. No. 14/823,928, dated May 31, 2017, 15 pages.
Non-Final Office Action received for U.S. Appl. No. 14/590,821, dated Sep. 21, 2016, 17 pages.
Non-Final Office Action received for U.S. Appl. No. 14/822,614, dated Oct. 23, 2017, 17 pages.
Non-Final Office Action received for U.S. Appl. No. 14/822,614, dated Oct. 27, 2016, 17 pages.
Non-Final Office Action received for U.S. Appl. No. 14/823,928, dated Jan. 20, 2017, 18 pages.
Non-Final Office Action received for U.S. Appl. No. 14/823,945, dated Dec. 12, 2016, 13 pages.
Notice of Allowance received for U.S. Appl. No. 14/590,821, dated Jul. 18, 2017, 5 pages.
Notice of Allowance received for U.S. Appl. No. 14/822,614, dated Jul. 17, 2018, 7 pages.
Notice of Allowance received for U.S. Appl. No. 14/823,928, dated Oct. 13, 2017, 11 pages.
Notice of Allowance received for U.S. Appl. No. 14/823,945, dated Apr. 25, 2017, 7 pages.

\* cited by examiner

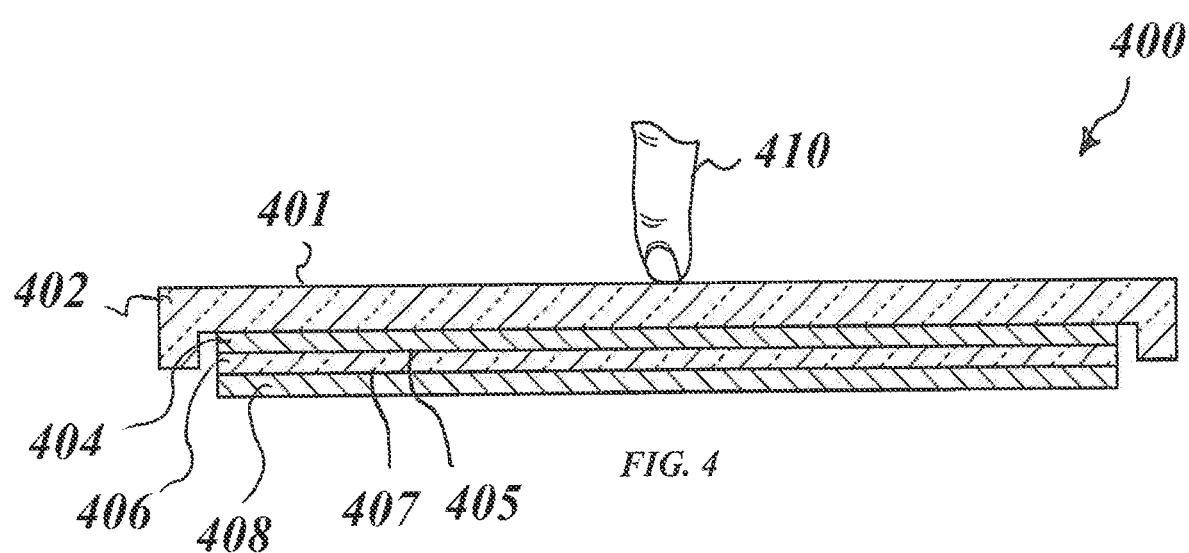
FIG. 4
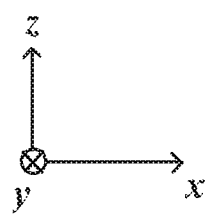

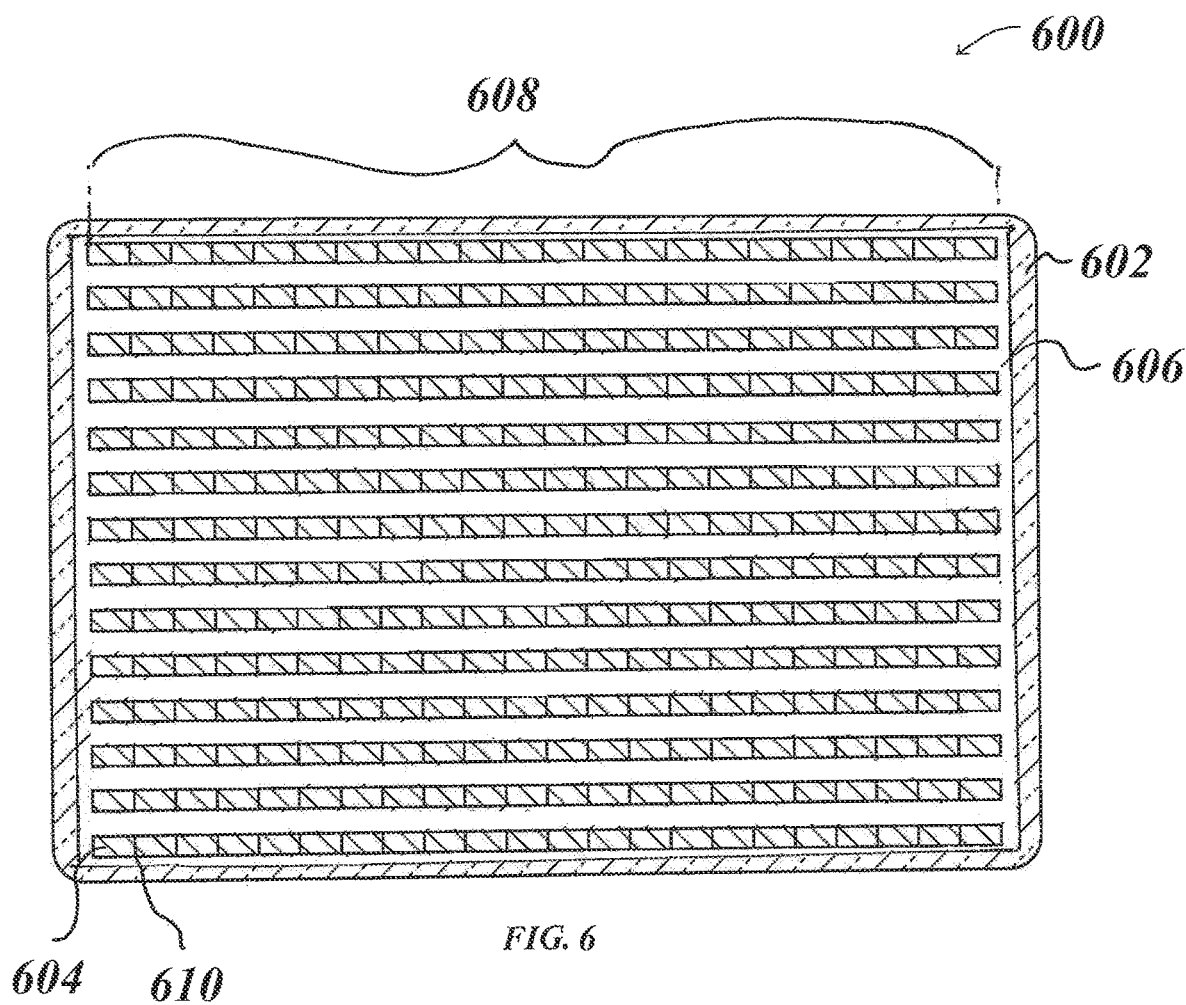
FIG. 6
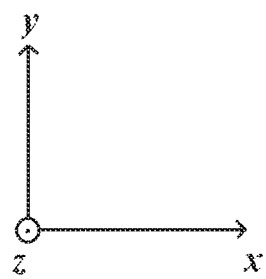

ULTRASONIC TOUCH DETECTION THROUGH DISPLAY

CROSS-REFERENCE TO RELATED APPLICATIONS

This application claims benefit of U.S. Provisional Patent Application No. 62/624,046, filed Jan. 30, 2018, the entire disclosures of which is incorporated herein by reference for all purposes.

FIELD OF THE DISCLOSURE

This relates generally to touch sensing and, more particularly, to various methodologies and applications of acoustic touch detection.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, have become extremely popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and approaching objects may be detected near the surface without actually touching the surface. Capacitive-type touch sensing system, however, can experience reduced performance due to electrically floating objects (e.g., water droplets) in contact with the touch-sensitive surface.

SUMMARY

This relates to system architectures, apparatus and methods for acoustic touch detection (touch sensing) and exemplary applications of the system architectures, apparatus and methods. Position of an object touching a surface can be determined using time of flight (TOF) bounding box techniques, acoustic image reconstruction techniques, acoustic tomography techniques, attenuation of reflections from an array of barriers, or a two-dimensional piezoelectric receiving array, for example. Acoustic touch sensing can utilize transducers, such as piezoelectric transducers, to transmit ultrasonic waves along a surface and/or through the thickness of an electronic device to the surface. As the ultrasonic wave propagates, one or more objects (e.g., fingers, styli) in contact with the surface can interact with the transmitted wave causing attenuation, redirection and/or reflection of at least a portion of the transmitted wave. Portions of the transmitted wave energy after interaction with the one or more objects can be measured to determine the touch location(s) of the one or more objects on the surface of the device. For example, one or more transducers (e.g., acoustic transducers) coupled behind the display of a device can be configured to transmit an acoustic wave through the thickness of a device (e.g., through the display stack and/or glass surface) to the surface and can receive a portion of the wave reflected back when the acoustic wave encounters a finger or object touching the surface. The location of the object can be determined, for example, based on the amount of time elapsing between the transmission of the wave and the detection of the reflected wave (e.g., time-of-flight ranging) and/or changes in the amplitude of the reflected wave. Acoustic touch sensing can be used instead of, or in conjunction with, other touch sensing techniques, such as resistive and/or capacitive touch sensing. In some examples, the acoustic touch sensing techniques described herein can be integrated into a display. In some examples, the acoustic touch sensing techniques described herein can be used on a glass surface of a display or touch screen. In some examples, an acoustic touch sensing system can be configured to be insensitive to contact on the device surface by water, and thus acoustic touch sensing can be used for touch sensing in devices that are likely to become wet or fully submerged in water.

BRIEF DESCRIPTION OF THE DRAWINGS

FIG. 4 illustrates an exemplary acoustic touch sensing system stack-up according to examples of the disclosure.

FIG. 6 illustrates an exemplary transducer and electrode configuration for acoustic touch sensing according to examples of the disclosure.

DETAILED DESCRIPTION

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

Figure 1A:
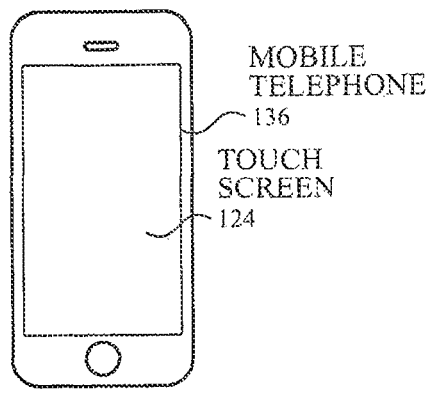
FIGS. 1A-1E illustrate exemplary electronic devices that can include an acoustic touch sensing system according to examples of the disclosure.
Figure 1B:
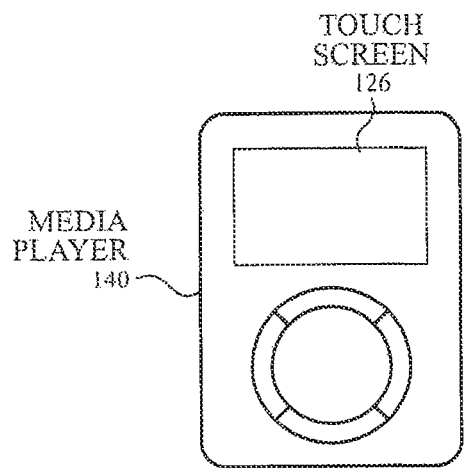
Figure 1C:
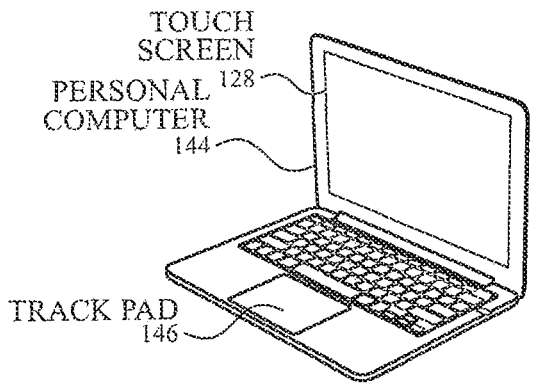
Figure 1D:
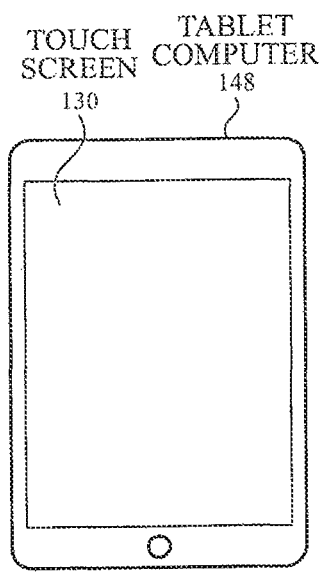
Figure 1E:
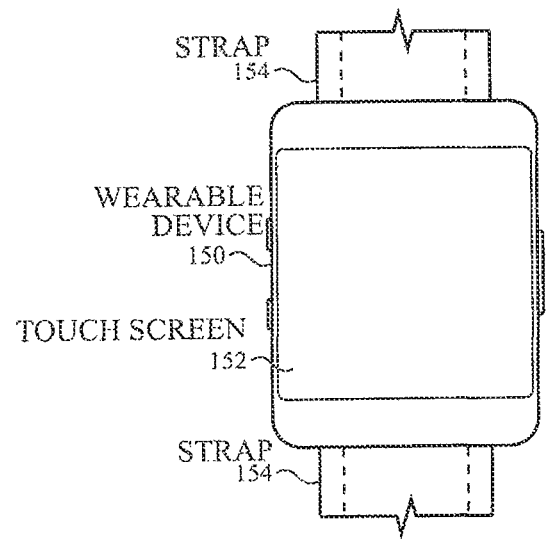

FIGS. 1A-1E illustrate examples of systems with touch screens that can include acoustic sensors for detecting contact between an object (e.g., a finger or stylus) and a surface of the system. FIG. 1A illustrates an exemplary mobile telephone 136 that includes a touch screen 124 and can include an acoustic touch sensing system according to examples of the disclosure. FIG. 1B illustrates an example digital media player 140 that includes a touch screen 126 and can include an acoustic touch sensing system according to examples of the disclosure. FIG. 1C illustrates an example personal computer 144 that includes a touch screen 128 and a track pad 146, and can include an acoustic touch sensing system according to examples of the disclosure. FIG. 1D illustrates an example tablet computing device 148 that includes a touch screen 130 and can include an acoustic touch sensing system according to examples of the disclosure. FIG. 1E illustrates an example wearable device 150 (e.g., a watch) that includes a touch screen 152 and can include an acoustic touch sensing system according to examples of the disclosure. Wearable device 150 can be coupled to a user via strap 154 or any other suitable fastener. It should be understood that the example devices illustrated in FIGS. 1A-1E are provided by way of example, and other types of devices can include an acoustic touch sensing system for detecting contact between an object and a surface of the device.

Acoustic sensors can be incorporated in the above described systems to add acoustic touch sensing capabilities to a surface of the system. For example, in some examples, a touch screen (e.g., capacitive, resistive, etc.) can be augmented with acoustic sensors to provide a touch sensing capability for use in wet environments or under conditions where the device may get wet (e.g., exercise, swimming, rain, washing hands). In some examples, an otherwise non-touch-sensitive display screen can be augmented with acoustic sensors to provide a touch sensing capability. In such examples, a touch screen can be implemented without the stack-up required for a capacitive touch screen. In some examples, the acoustic sensors can be used to provide touch sensing capability for a non-display surface. For example, the acoustic sensors can be used to provide touch sensing capabilities for a track pad 146, a button, a scroll wheel, part or all of the housing or any other surfaces of the device (e.g., on the front, rear or sides).

Figure 2:
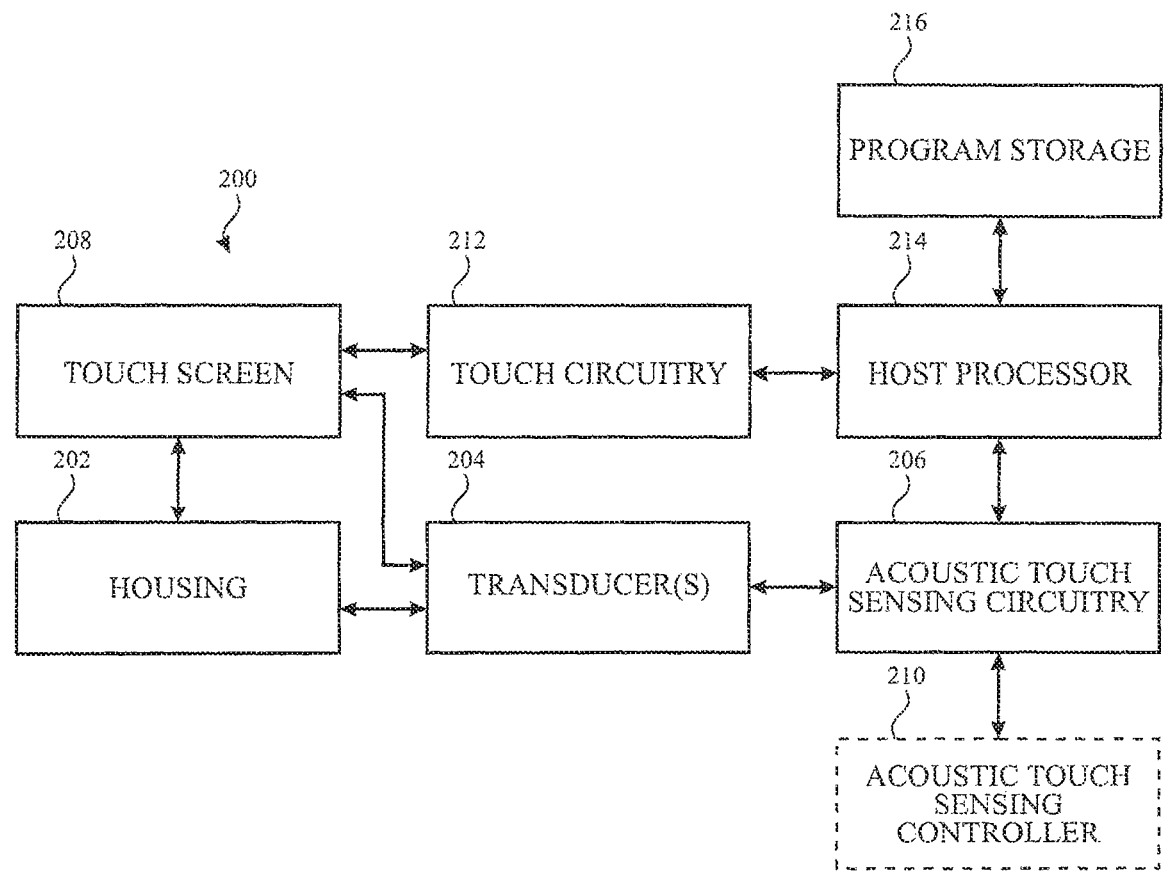
FIG. 2 illustrates an exemplary block diagram of an electronic device including an acoustic touch sensing system according to examples of the disclosure.

FIG. 2 illustrates an exemplary block diagram of an electronic device including an acoustic touch sensing system according to examples of the disclosure. In some examples, housing 202 of device 200 (which can correspond to devices 136, 140, 144, 148, and 150 above) can be coupled with one or more acoustic transducers 204. In some examples, transducers 204 can be piezoelectric transducers, which can be made to vibrate by the application of electrical signals when acting as a transmitter, and generate electrical signals based on detected vibrations when acting as a receiver. In some examples, the transducers 204 can be formed from a piezoelectric ceramic material (e.g., PZT or KNN) or a piezoelectric plastic material (e.g., PVDF). Similarly, transducers 204 can produce electrical energy as an output when vibrated. In some examples, the transducers 204 can be bonded to the housing 202 by a bonding agent (e.g., a thin layer of stiff epoxy). In some examples, the transducers 204 can be deposited on the surface through processes such as deposition, lithography, or the like. In some examples, the transducers 204 can be bonded to the surface using conductive or non-conductive bonding materials. When electrical energy is applied to the transducers 204 it can cause the transducers to vibrate, the surface material in contact with the transducers can also be caused to vibrate, and the vibrations of the molecules of the surface material can propagate as an acoustic wave through the surface material. In some examples, vibration of the transducers 204 can be used to produce ultrasonic acoustic waves at a selected frequency over a broad frequency range (e.g., 400 kHz-10 MHz) in the medium of the surface of the electronic device which can be metal, plastic, glass, wood, or the like. It should be understood that other frequencies outside of the exemplary range above can be used while remaining within the scope of the present disclosure.

In some examples, transducers 204 can also be partially or completely disposed under or behind a display 208 (e.g., an Organic Light Emitting Diodes (OLED) display) such that the transducers are not visible to a user. When electrical energy is applied to the transducers 204 it can cause the transducers to vibrate, the display materials in contact with the transducers can also be caused to vibrate, and the vibrations of the molecules of the display materials can propagate as an acoustic wave through them. In some examples, display 208 can be a touch screen (e.g., capacitive) and the transducers 204 can be partially or completely disposed on (or coupled to) a portion of the touch screen display 208. For example, the touch screen display 208 may comprise a glass panel (cover glass), and a display region of the touch screen may be surrounded by a non-display region (e.g., a black border region surrounding the periphery of the display region of touch screen). In some examples, transducers 204 can be disposed partially or completely in the black mask region of the touch screen display 208 glass panel (e.g., on the back side of the glass panel behind the black mask) such that the transducers are not visible (or are only partially visible) to a user.

Device 200 can further comprise acoustic touch sensing circuitry 206, which can include circuitry for driving electrical signals to stimulate vibration of the transducers 204 (e.g., transmit circuitry), as well as circuitry for sensing electrical signals output by the transducers (e.g., receive circuitry) when the transducer is stimulated by received acoustic energy. In some examples, timing operations for the acoustic touch sensing circuitry 206 can optionally be provided by a separate acoustic touch sensing controller 210 that can control timing of acoustic touch sensing circuitry 206 operations. In some examples, touch sensing controller 210 can be coupled between acoustic touch sensing circuitry 206 and host processor 214. In some examples, controller functions can be integrated with the acoustic touch sensing circuitry 206 (e.g., on a single integrated circuit). Output data from acoustic touch sensing circuitry 206 can be output to a host processor 214 for further processing to determine a location of an object contacting the device as will be described in more detail below. In some examples, the processing for determining location of a contacting object can be performed by the acoustic touch sensing circuitry 206, controller 210 or a separate sub-processor of device 200 (not shown).

In addition to acoustic touch sensing, the device can include additional touch circuitry 212 and optionally a touch controller (not shown) that can be coupled to the touch screen display 208. In examples including a touch controller, the touch controller can be disposed between the touch circuitry 212 and the host processor 214. The touch circuitry 212 can, for example, be capacitive or resistive touch sensing circuitry, and can be used to detect contact and/or hovering of objects (e.g., fingers, styli) in contact with and/or in proximity to the touch screen display 208, particularly in the display region of the touch screen. Thus, device 200 can include multiple types of sensing circuitry (e.g., touch circuitry 212 and acoustic touch sensing circuitry 206) for detecting objects (and their positions) in different regions of the device and/or for different purposes, as will be described in more detail below. Although described herein as including a touch screen, it should be understood that touch circuitry 212 can be omitted and touch screen display 208 can be replaced by an otherwise non-touch-sensitive display (e.g., but—for the acoustic touch sensors).

Host processor 214 can receive acoustic or other touch outputs (e.g., capacitive) and perform actions based on the touch outputs. Host processor 214 can also be connected to program storage 216 and touch screen display 208. Host processor 214 can, for example, communicate with touch screen display 208 to generate an image on touch screen display 208, such as an image of a UI, and can use touch sensing circuitry 212 and/or acoustic touch sensing circuitry 206 (and, in some examples, their respective controllers) to detect a touch on or near touch screen display 208, such as a touch input to the displayed UI. The touch input can be used by computer programs stored in program storage 216 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 214 can also perform additional functions that may not be related to touch processing.

Note that one or more of the functions described herein can be performed by firmware stored in memory and executed by the touch circuitry 212 and/or acoustic touch sensing circuitry 206 (or their respective controllers), or stored in program storage 216 and executed by host processor 214. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 200 is not limited to the components and configuration of FIG. 2, but can include other or additional components in multiple configurations according to various examples. Additionally, the components of device 200 can be included within a single device or can be distributed between multiple devices. Additionally, it should be understood that the connections between the components are exemplary and different unidirectional or bidirectional connections that can be included between the components depending on the implementation, irrespective of the arrows shown in the configuration of FIG. 2.

Figure 3:
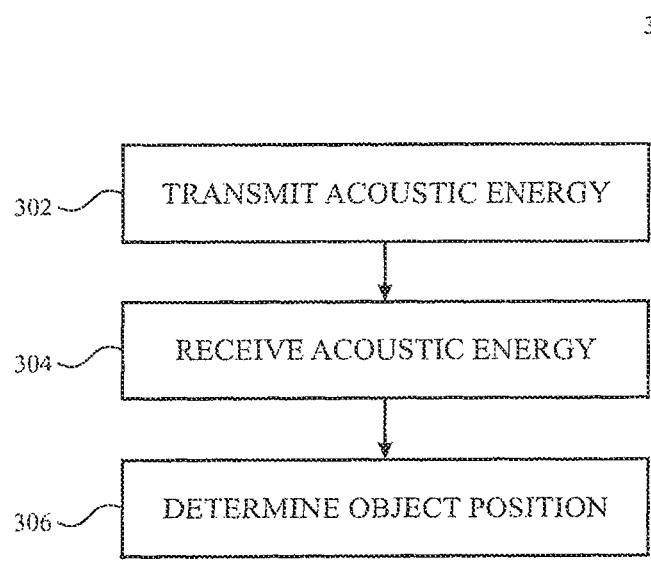
FIG. 3 illustrates an exemplary method for acoustic touch sensing to determine a position of an object in contact with a surface according to examples of the disclosure.

FIG. 3 illustrates an exemplary method 300 for acoustic touch sensing of an object contact position according to examples of the disclosure. At 302, acoustic energy can be transmitted (e.g., by one or more transducers 204) through a stack-up that can include a display and/or any other layers (e.g., cover glass, bonding layer(s)) to a surface of a device in the form of an ultrasonic wave. In some examples, the wave can propagate as a compressive wave, a shear horizontal wave, a Rayleigh wave, a Lamb wave, a Love wave, a Stoneley wave, or a surface acoustic wave. Other propagation modes for the transmitted acoustic energy can also exist based on the properties of the display, surface material, and any intermediate layers, and the manner of energy transmission from the transducers to the surface of the device. In some examples, the surface can be formed from glass or sapphire crystal (e.g., display 208) or the surface can be formed from metal, plastic, or wood (e.g., housing 202). Transmitted energy can propagate through the display to the surface of the device until a discontinuity in the surface is reached, which can cause a portion of the energy to reflect. In some examples, a discontinuity can occur at edges of the surface material (e.g., when the ultrasonic wave propagates to the edge of the surface opposite the transducer). In some examples, a discontinuity can be an irregularity in the shape of the surface (e.g., a groove or pattern etched into the surface). In some examples, a discontinuity can be a reflective material coupled to the surface (e.g., deposited). In some examples, an object in contact with the surface (e.g., a user's finger) can also be a discontinuity. When the transmitted energy reaches one of the discontinuities described above, some of the energy can be reflected, and a portion of the reflected energy can be directed to the one or more transducers 204. In some examples, the propagation mode of acoustic energy can be selected such that water or other fluids in contact with the surface of the device (e.g., device 200) will not interact with the acoustic waves, and thus can be invisible to the acoustic sensing technique. In some examples, an exemplary the acoustic touch sensing method can be effective for detecting the presence of an object (e.g., a user's finger) even in the presence of water drops (or other low-viscosity fluids) on the surface of the device or even while the device is fully submerged.

At 304, returning acoustic energy can be received, and the acoustic energy can be converted to an electrical signal by one or more transducers 204. At 306, the acoustic sensing system can determine whether one or more objects is contacting the surface of the device, and can further detect the position of one or more objects based on the received acoustic energy. In some examples, a distance of the object from the transmission source (e.g., transducers 204) can be determined from a TOF between transmission and reception of reflected energy, and a propagation rate of the ultrasonic wave through the material. In some examples, TOF measurements from multiple transducers at different positions can be used to triangulate or trilaterate object position. In some examples, baseline reflected energy from one or more intentionally included discontinuities (e.g., barriers, ridges, grooves, etc.) can be compared to a measured value of reflected energy. The baseline reflected energy can be determined during a measurement when no object (e.g., finger) is in contact with the surface. In some examples, reflected energy can be measured at different positions relative to the surface (e.g., at touch pixels as will be described further below). A position of measured deviations of the reflected energy from the baseline can be correlated with a location of an object. Although method 300, as described above, generally refers to reflected waves received by the transducers that transmitted the waves, in some examples, the transmitter and receiver functions can be separated such that the transmission of acoustic energy at 302 and receiving acoustic energy at 304 may not occur at the same transducer. Exemplary device configurations and measurement timing examples that can be used to implement method 300 will be described in further detail below.

FIG. 4 illustrates an exemplary cross-sectional view of acoustic touch sensing system stack-up 400 including cover glass 402 (e.g., front crystal), display 406 (e.g., OLED), and transducer(s) 408. While the illustrated stack-up 400 in FIG. 4 is exemplary, it should be understood that in some examples, the stack-up 400 can include additional layers without departing from the scope of the present disclosure. In some examples, cover glass 402 can be mounted on a first side 405 of display 406 and transducer 408 can be mounted on a second side 407 of display 406 (e.g., under or behind display 406). In some examples, transducer 408 can be mounted between the cover glass and the transducer 408 can be configured to generate acoustic waves (e.g., shear horizontal waves) that propagate through the stack-up (e.g., through display 406, adhesive 404, and cover glass 402) to the surface 401 of cover glass 402 and to receive the reflected acoustic waves from the surface 401 of cover glass 402 and/or from object 410 (e.g., a finger or stylus). In some examples, an adhesive 404 (e.g., liquid optically clear adhesive (LOCA)) can be used to affix the display 406 to cover glass 402. In some examples, the impedance characteristic of the adhesive 404 material can have a significant impact on transmission of acoustic waves through the touch sensing system stack-up. For example, a hard epoxy can be used as the adhesive 404 in order to provide impedance matching at both the front crystal 402/adhesive interface and at the adhesive/display 406 interface. In some examples, a poor impedance match between layers can result in a reduction in the amplitude of the acoustic waves (e.g., shear horizontal wave) that are transmitted to the front surface of the cover glass 402, and increases the amplitude of the acoustic waves reflected back toward the transducer 408. It should be understood that although illustrated single transducers are illustrated as performing both transmit and receive functions (i.e., transceivers), in some examples, the transmit and receive functions can be performed by separate transducers (e.g., by two transducers in proximity to one another, rather than one transmit and receive transducer).

When an object 410 is touching the cover glass 402 (e.g., a touch condition), the object 410 can absorb and/or reflect a portion of the transmitted shear wave. Furthermore, the object 410 can change the impedance seen by the transducer relative to when there is no object in contact with the cover glass 402. Accordingly, several different sensing techniques can be used to detect the presence and location of an object. In a first exemplary sensing technique, TOF can be used to determine the presence of object 410 (e.g., a touch event on the surface 401 of the cover glass 402). The TOF measurement can be carried out by measuring the time between transmission of the shear horizontal wave and detection of returned energy from the shear horizontal wave. If the shear horizontal wave interacts with an object (e.g., finger 410) on the surface 401 of the cover glass 402, a portion of the incident energy can reflect and return to the transducer 408 and/or other nearby transducers (or pixels, as described further below). The amount of time (e.g., TOF) and the speed of propagation of the wave can be used to determine the distance of the object from the origin point of the transmitted wave. The TOF of the reflected wave when no object 410 is touching the cover glass 402 can be used as a baseline for comparing the time of flight of reflected energy from an object 410. In a second exemplary sensing technique, absorption of a portion of the transmitted energy by an object 410 can be used to determine the presence of an object. In some examples where the reflected energy can be received at multiple locations (e.g., pixels) simultaneously, the location of the touch event can then be determined by triangulating or trilaterating the received signals at the different locations. In some examples, a baseline amplitude (or energy) of reflected acoustic waves from the surface 401 of cover glass 402 can be determined for a no-touch condition. If a portion of the transmitted wave is absorbed by an object 410 in contact with the cover glass 402, the change in amplitude (or energy) in the reflected wave can be used to detect the presence of the object. In a third exemplary detection technique, a baseline impedance of the stack-up 400 can be determined for a no-touch condition, such that changes in impedance caused by an object 410 in contact with the cover glass 402 can be measured.

Figure 5:
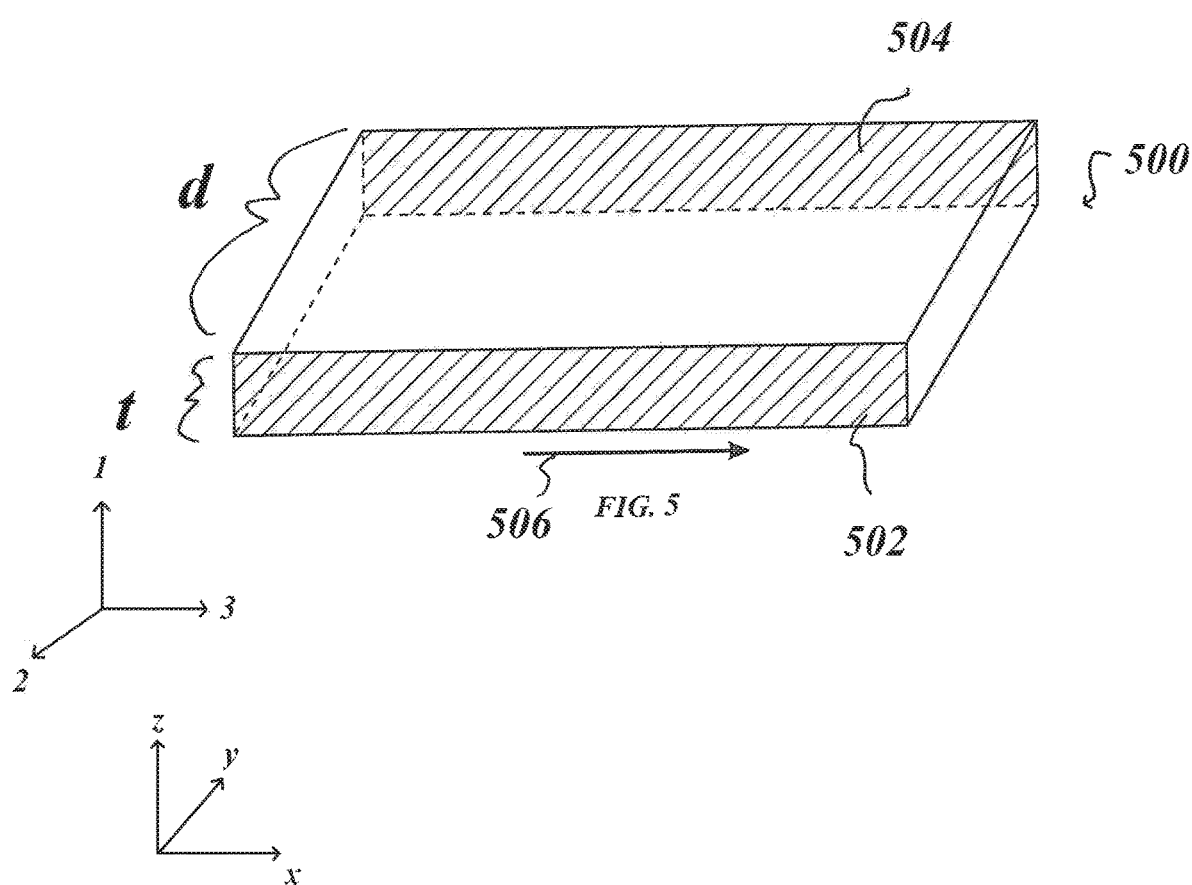
FIG. 5 illustrates an exemplary transducer according to examples of the disclosure.

FIG. 5 illustrates an exemplary transducer 500 (e.g., corresponding to transducer 408 above) according to examples of the disclosure. As noted above, a shear horizontal wave may not interact with water present on the surface of a cover glass (e.g., 402 above). In some examples, waves of the lowest shear horizontal mode (SH0) can be produced by operating a piezoelectric transducer in either a $d_{15}$ mode or a $d_{24}$ mode. In the example illustrated in FIG. 5, the transducer can be operated in a $d_{24}$ mode to produce a shear horizontal wave that propagates in the direction of the z-axis (e.g., through the display and cover glass). In addition to the shear horizontal wave, a Lamb wave can be produced by the shearing displacement that propagates along the x-axis direction (e.g., both to the left and right). The $d_{24}$ mode of operation can be accomplished by stimulating electrodes places on sides 502 and 504 of transducer 500 and with poling direction 506 of the transducer along the x-axis direction (e.g., "3" axis of the crystal lattice structure). In order for the acoustic wave to travel through the full thickness of the display stack up to the surface of the front crystal and reflect back to the transducer, a low frequency acoustic wave (e.g., 1 MHz or lower) may be generated. In the $d_{24}$ mode of operation, the frequency of the shear horizontal wave can be inversely proportional to on the distance between the electrodes 502 and 504 (e.g., distance "d"). Accordingly, in order to lower the frequency of the shear wave, the distance d must be increased. Such an adjustment of the distance d would not require a corresponding increase in the thickness t. Thus, in some examples, this configuration would allow transducer 500 to drive a signal at a desired frequency independent of thickness "t" of the transducer 500. In some examples, this thickness independence for operating frequency can allow for thickness selection of the transducer 500 based primarily on the required signal strength to obtain a desired signal to noise ratio (SNR) as well as a desired total thickness for the display stack-up (e.g., 400 above). Although FIG. 5 illustrates a transducer with single electrodes 502 and 504 on opposing sides, it should be understood that the transducer can be divided into individual pixels by providing separate electrodes on different sections of the transducer. In some examples, one of the electrodes 502/504 can remain continuous along the full length and serve as a common electrode, while the opposing electrode 504/502 can be pixelated. An exemplary pixelated electrode arrangement will be described in more detail in connection with FIG. 6 below.

In some alternative examples, a transducer operating in a $d_{15}$ mode can also be used to produce shear horizontal waves that propagate in the z-axis direction. In some examples, the $d_{15}$ mode can be achieved by moving the electrodes 502 and 504 to the top and bottom sides of the transducer 500 with the same poling direction 506. In such a configuration, a shear horizontal mode wave can be created to propagate in the z-axis direction similar to the $d_{24}$ mode described above. Unlike the $d_{24}$ mode, in the case of the $d_{15}$ mode, the frequency of operation is inversely proportional to the thickness "t" of the transducer 500. Thus, in order to reduce the frequency of a transmitted wave, the thickness "t" can be increased. For an exemplary frequency of 1 MHz, the thickness of the transducer can be around about 1 mm and for an exemplary frequency of 0.5 MHz, the thickness of the transducer can be around about 2 mm. Thus, for low frequencies the thickness required to achieve the proper frequency can become prohibitively large. While thinner transducers are possible with the use of a higher frequency (e.g., 5 MHz), higher frequencies can experience greater attenuation resulting in a reduction of signal strength from reflected waves received at the transducer 500.

FIG. 6 illustrates a top view of an exemplary acoustic touch sensing system configuration 600 including cover glass 602 (e.g., corresponding to cover glass 402) (e.g., front crystal), display 606 (e.g., corresponding to display 406), and transducers 608 (e.g., corresponding to transducer 408). Configuration 600 also illustrates pixelated electrodes 604 and gaps 610 between the electrodes that can be used to form separate sensing pixels for the acoustic touch sensor. In the illustration, the display region 606 is shown without shading so that the transducers 608 as well as the pixelated electrodes 604 and gaps 610 can be more easily distinguished. In some examples, each of the pixelated electrodes 604 of a particular transducer 608 can be simultaneously driven (e.g., during a transmission) and accordingly the entire length of each transducer 608 produce a plane shear horizontal wave that propagates through the stack-up (e.g., stack-up 400 above) through the z-axis direction. In some examples, a subset of the pixelated electrodes 604 of a single transducer 608 can be simultaneously driven. As mentioned above, if the transistor is operated in the $d_{24}$ mode, lamb waves may also be produced at the ends of the transducer bars, which may result in an increased sensitivity to the presence of water on the cover glass 602 in the proximity of the pixelated electrodes 604 located proximate to either end of the bar transducer 608. Accordingly, the elongated shape of transducers 608 can reduce the presence and effects of compressional waves (e.g., a component of a generated Lamb wave) toward the center of each transducer. As such, configuration 600 can reduce false positive measurements of touch due to water or other viscous fluids on the surface of a device (e.g., will not confuse water on the cover glass as a touch condition). In some examples, each of the bar transducers 608 can be driven serially to perform a row-by-row scan of touch on the cover glass 602. In some examples, bar transducers 608 can be driven in groups of two or more. In some examples, groups of bar transducers 608 that are simultaneously driven can be separated by one or more inactive rows to prevent interference between the acoustic waves created at each of the driven bar transducers. In some examples, the width of transducers can extend to the edges of display 604 and/or the edges of cover glass 602 (e.g., extend the full width of the display 604 and/or cover glass 602). In some examples, the display 604 can extend to the full area of cover glass 602, as the transducer-based touch sensing is operable on and/or near metal surfaces unlike some other touch sensing techniques such as capacitive touch sensing.

Figure 7:
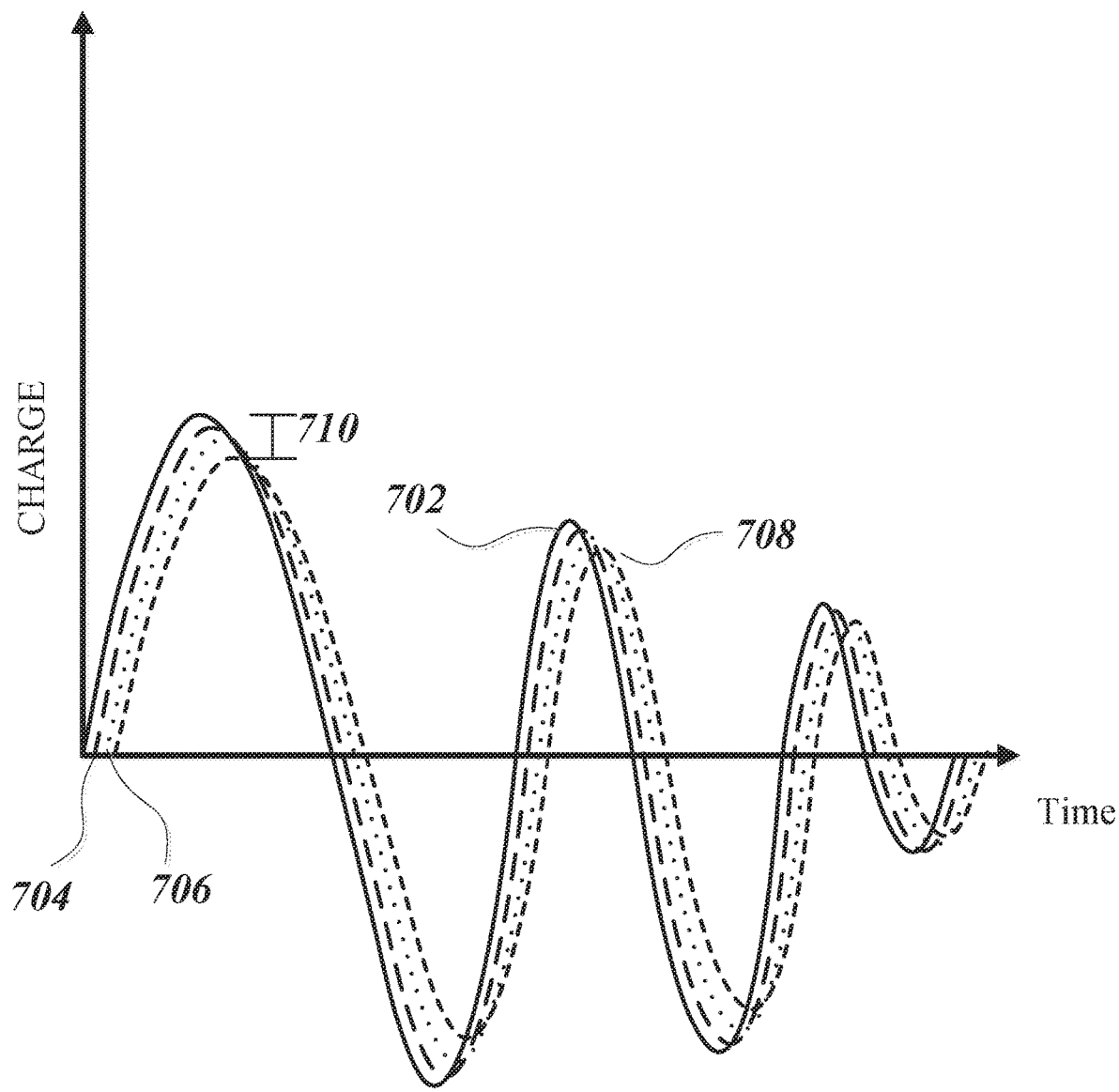
FIG. 7 illustrates an exemplary timing diagram for acoustic touch sensing according to examples of the disclosure.

FIG. 7 illustrates an exemplary timing diagram for acoustic touch sensing according to examples of the disclosure. FIG. 7 illustrates a plurality of waveforms 702-708 that can represent a transducer charge output versus time. Signal 702 can correspond to the acoustic energy received at a pixel of the transducer (e.g., reflected back from the surface of the cover glass 402 and/or 602 above) without a touch condition (e.g., without an object on the surface of the cover glass). In some examples, signal 702 can correspond to the baseline amplitude of reflected acoustic waves described above with reference to FIG. 4. This baseline amplitude of reflected acoustic waves can also be indicative of the impedance seen by the transducer without any nearby touching object. In some examples, particularly where the transmitted acoustic wave from the transducer is a shear horizontal wave, water on the surface of the cover glass near the particular touch pixel (e.g., pixel 604 above) does not interact with the shear horizontal wave, and accordingly the baseline signal 702 is unaltered even in the presence of water. Waveform 708 can correspond to the acoustic energy at the transducer received from the wave reflected off of an object (e.g., corresponding to object 410) on or near the surface of the cover glass. In particular, the object touching the surface of the cover glass can absorb/and or reflect a portion of the acoustic wave transmitted from the transducer. As a result, the peak amplitude of the waveform 708 can be reduced since less of the energy is returned to the transducer. The difference 710 between the peak amplitude of the baseline waveform 702 and the waveform 708 can be used to detect a touch condition as described above with reference to FIG. 4. In addition, FIG. 7 illustrates a phase shift in the waveform 708 that can occur relative to the baseline waveform 702 as a result of interactions between the shear wave and the touching object that can further be used to detect a touch condition. In some examples, a combination of the amplitude change and phase change in the waveform 708 can be used as a measure of the impedance seen by the transistor for detecting the presence of an object. In some examples, a change in amplitude, phase, and/or impedance can be compared to a threshold change to distinguish between a touching condition and a non-touching condition.

Therefore, according to the above, some examples of the disclosure are directed to an apparatus comprising: a cover surface, a display panel coupled to the cover surface, a plurality of bar transducers coupled to the display panel, each bar transducer comprising: a plurality of electrodes coupled to the bar transducer and configured to divide the bar transducer into a plurality of touch sensing pixels, and control circuitry configured to: simultaneously stimulate a first plurality of electrodes coupled to a first bar transducer to produce a shear horizontal wave and measure a plurality of electrical signals received at each pixel of a first plurality of touch sensing pixels corresponding to the first plurality of electrodes coupled to the first bar transducer. Additionally or alternatively to one or more of the examples disclosed above, in some examples, the control circuitry is further configured to determine a position of an object in contact with the cover surface based on measured values at one or more of the plurality of touch sensing pixels. Additionally or alternatively to one or more of the examples disclosed above, in some examples, determining the position of the object comprises: receiving a baseline measurement value for each of the first plurality of touch sensing pixels; and comparing each of the measured values at the one or more of the plurality of touch sensing pixels respectively to the baseline measurement value. Additionally or alternatively to one or more of the examples disclosed above, in some examples, the plurality of bar transducers is configured to operate in a $d_{24}$ mode. Additionally or alternatively to one or more of the examples disclosed above, in some examples, the plurality of bar transducers is configured to operate in a $d_{15}$ mode. Additionally or alternatively to one or more of the examples disclosed above, in some examples, the position of the object comprises capturing time of flight information based on the transmitted shear horizontal wave at multiple pixels and determining the position of the object based on the captured time of flight information at the multiple pixels. Additionally or alternatively to one or more of the examples disclosed above, in some examples, an adhesive layer disposed between the cover surface and the display panel provides an impedance match for a shear horizontal wave at a frequency of the transmitted shear horizontal wave.

Some examples of the disclosure are directed to a method comprising: stimulating a first bar transducer to transmit a shear horizontal wave through a display stack-up comprising a display panel and a cover surface coupled to the display panel, and measuring a plurality of electrical signals received at each pixel of a first plurality of touch sensing pixels corresponding to a first plurality of electrodes coupled to the first bar transducer.

Some examples of the disclosure are directed to a non-transitory computer readable storage medium having stored thereon a set of instructions that when executed by a processor causes the processor to: stimulate a first bar transducer to transmit a shear horizontal wave through a display stack-up comprising a display panel and a cover surface coupled to the display panel, and measure a plurality of electrical signals received at each pixel of a first plurality of touch sensing pixels corresponding to a first plurality of electrodes coupled to the first bar transducer.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:
1. An apparatus comprising:
   a cover surface;
   a display panel coupled to the cover surface;
   a plurality of transducers coupled the display panel, the plurality of transducers comprising:
      a plurality of elongated piezoelectric bars including a first elongated piezoelectric bar and a second elongated piezoelectric bar; and
      a plurality of electrodes coupled to the plurality of elongated piezoelectric bars, wherein a first plurality of electrodes of the plurality of electrodes is coupled to the first elongated piezoelectric bar and a second plurality of electrodes of the plurality of electrodes is coupled to the second elongated piezoelectric bar;
      wherein a first plurality of transducers of the plurality of transducers includes a first transducer formed from a first portion of the first piezoelectric bar and a first pair of electrodes of the first plurality of electrodes and a second transducer formed from a second portion of the first piezoelectric bar and a second pair of electrodes of the first plurality of electrodes, and wherein a second plurality of transducers of the plurality of transducers includes a third transducer formed from a first portion of the second piezoelectric bar and a first pair of electrodes of the second plurality of electrodes and a fourth transducer formed from a second portion of the second piezoelectric bar and a second pair of electrodes of the second plurality of electrodes; and
   control circuitry coupled to the plurality of transducers configured to:
      simultaneously stimulate the first plurality of electrodes to transmit a shear horizontal wave and
      measure a plurality of electrical signals received at the first plurality of electrodes from reflections of the shear horizontal wave, the plurality of electrical signals including a first electrical signal received at the first transducer and a second electrical signal received at the second transducer.

2. The apparatus of claim 1, wherein the control circuitry is further configured to determine a position of an object in contact with the cover surface based on measured signal values at the plurality of transducers.

3. The apparatus of claim 2, wherein determining the position of the object comprises:
   receiving a plurality of baseline measurement values for the first plurality of transducers, each of the plurality of baseline measurement values corresponding to one of the first plurality of transducers; and
   comparing each of the measured signal values for the first plurality of transducers respectively to the corresponding baseline measurement value of the plurality of baseline measurement values.

4. The apparatus of claim 2, wherein determining the position of the object comprises capturing time of flight information based on the transmitted shear horizontal wave and the reflections of the shear horizontal wave at the first plurality of transducers and determining the position of the object based on the captured time of flight information at the first plurality of transducers.

5. The apparatus of claim 1, wherein the plurality of transducers is configured to operate in a $d_{24}$ mode.

6. The apparatus of claim 1, wherein the plurality of transducers is configured to operate in a $d_{15}$ mode.

7. The apparatus of claim 1, wherein an adhesive layer disposed between the cover surface and the display panel provides an impedance match between the cover surface and the display panel at a frequency of the transmitted shear horizontal wave.

8. The apparatus of claim 1, wherein the cover surface is coupled to a first side of the display panel and the plurality of transducers are coupled to a second side of the display panel opposite the first side of the display panel, such that the transmitted shear horizontal wave propagates through the display panel and into the cover surface and the reflections of the shear horizontal wave propagate from the cover surface through the display panel.

9. The apparatus of claim 1, wherein the control circuitry is further configured to:
simultaneously stimulate the second plurality of electrodes to produce a second shear horizontal wave; and
measure a second plurality of electrical signals received at the second plurality of electrodes from reflections of the second shear horizontal wave, the second plurality of electrical signals including a first electrical signal received at the third transducer and a second electrical signal received at the fourth transducer.

10. The apparatus of claim 9, wherein the first plurality of electrodes and the second plurality of electrodes are simultaneously stimulated.

11. The apparatus of claim 1, wherein the plurality of elongated piezoelectric bars extend to edges of the display panel or to edges of the cover glass.

12. A method comprising:
at a device comprising a display stack-up coupled to a plurality of transducers, the plurality of transducers comprising: a plurality of elongated piezoelectric bars and a plurality of electrodes coupled to the plurality of elongated piezoelectric bars including a first transducer formed from a first portion of a first elongated piezoelectric bar and a first pair of electrodes of a first plurality of electrodes and a second transducer formed from a second portion of the first elongated piezoelectric bar and a second pair of electrodes of the first plurality of electrodes:
stimulating the first plurality of electrodes to transmit a shear horizontal wave through the display stack-up; and
measuring a plurality of electrical signals received at the first plurality of electrodes from reflections of the shear horizontal wave through the display stack-up, the plurality of electrical signals including a first electrical signal received at the first transducer and a second electrical signal received at the second transducer.

13. The method of claim 12, wherein the display stack-up comprises a display panel and a cover surface, the method further comprising:
determining a position of an object in contact with the cover surface based on measured signal values at the plurality of transducers.

14. The method of claim 13, wherein determining the position of the object comprises:
receiving a plurality of baseline measurement values for the first plurality of transducers, each of the plurality of baseline measurement values corresponding to one of the first plurality of transducers; and
comparing each of the measured signal values for the first plurality of transducers respectively to the corresponding baseline measurement value of the plurality of baseline measurement values.

15. The method of claim 13, wherein determining the position of the object comprises capturing time of flight information based on the transmitted shear horizontal wave and the reflections of the shear horizontal wave at the first plurality of transducers and determining the position of the object based on the captured time of flight information at the first plurality of transducers.

16. The method of claim 12, wherein the plurality of transducers is configured to operate in a $d_{15}$ mode.

17. The method of claim 12, wherein the plurality of transducers is configured to operate in a $d_{24}$ mode.

18. The method of claim 12, wherein the display stack-up comprises:
a display panel;
a cover surface; and
an adhesive layer disposed between the cover surface and the display panel, wherein the adhesive layer provides an impedance match between the cover surface and the display panel at a frequency of the transmitted shear horizontal wave.

19. A non-transitory computer readable storage medium having stored thereon a set of instructions that when executed by a device comprising a processor and a display stack-up coupled to a plurality of transducers, the plurality of transducers comprising a plurality of elongated piezoelectric bars and a plurality of electrodes coupled to the plurality of elongated piezoelectric bars including a first transducer formed from a first portion of a first elongated piezoelectric bar and a first pair of electrodes of a first plurality of electrodes and a second transducer formed from a second portion of the first elongated piezoelectric bar and a second pair of electrodes of the first plurality of electrodes, causes the device to:
stimulate the first plurality of electrodes to transmit a shear horizontal wave through the display stack-up; and
measure a plurality of electrical signals received at the first plurality of electrodes from reflections of the shear horizontal wave through the display stack-up, the plurality of electrical signals including a first electrical signal received at the first transducer and a second electrical signal received at the second transducer.

20. The non-transitory computer readable storage medium of claim 19, wherein the display stack-up comprises a display panel and a cover surface, the set of instructions when executed further causes the device to:
determine a position of an object in contact with the cover surface based on measured signal values at the plurality of transducers.

21. The non-transitory computer readable storage medium of claim 20, wherein determining the position of the object comprises:
receiving a plurality of baseline measurement values for the first plurality of transducers, each of the plurality of baseline measurement values corresponding to one of the first plurality of transducers; and
comparing each of the measured signal values for the first plurality of transducers respectively to the corresponding baseline measurement value of the plurality of baseline measurement values.

22. The non-transitory computer readable storage medium of claim 20, wherein determining the position of the object comprises capturing time of flight information based on the transmitted shear horizontal wave and the reflections of the shear horizontal wave at the first plurality of transducers and determining the position of the object based on the captured time of flight information at the first plurality of transducers.

23. The non-transitory computer readable storage medium of claim 19, wherein the plurality of transducers is configured to operate in a $d_{15}$ mode.

24. The non-transitory computer readable storage medium of claim 19, wherein the plurality of transducers is configured to operate in a $d_{24}$ mode.

25. The non-transitory computer readable storage medium of claim 19, wherein the display stack-up comprises:
- a display panel;
- a cover surface; and
- an adhesive layer disposed between the cover surface and the display panel, wherein the adhesive layer provides an impedance match between the cover surface and the display panel at a frequency of the transmitted shear horizontal wave.

* * * * *